May 26, 1925.　　　　　　　　　　　　　　　　　　　　1,539,586
F. J. MacDONALD
METHOD AND APPARATUS FOR ASSEMBLING PIECES OF ADHESIVE SHEET MATERIAL
Filed March 31, 1922　　　7 Sheets-Sheet 3
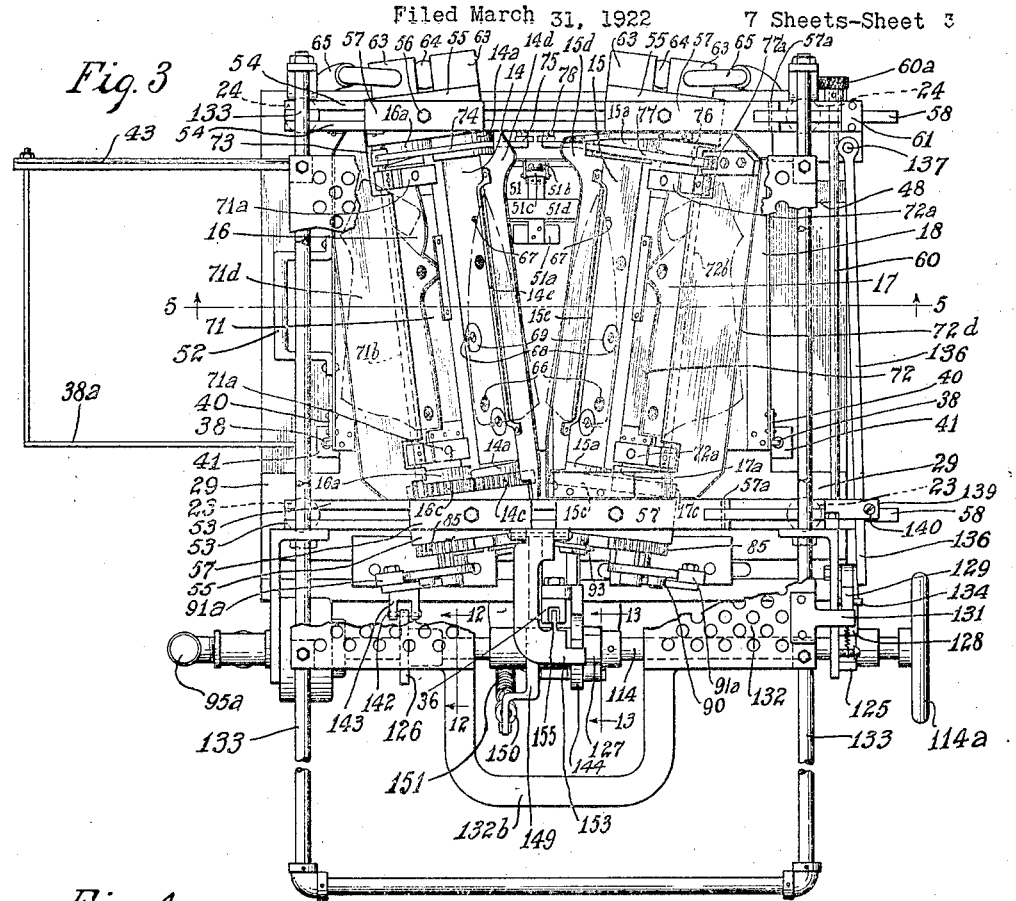
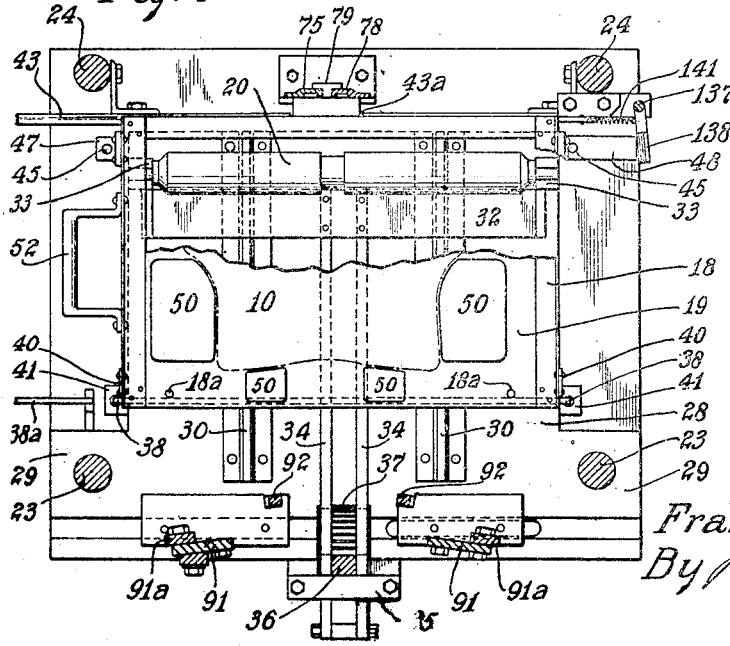
Inventor
Frank J. MacDonald
By Robert M. Pierson
Atty

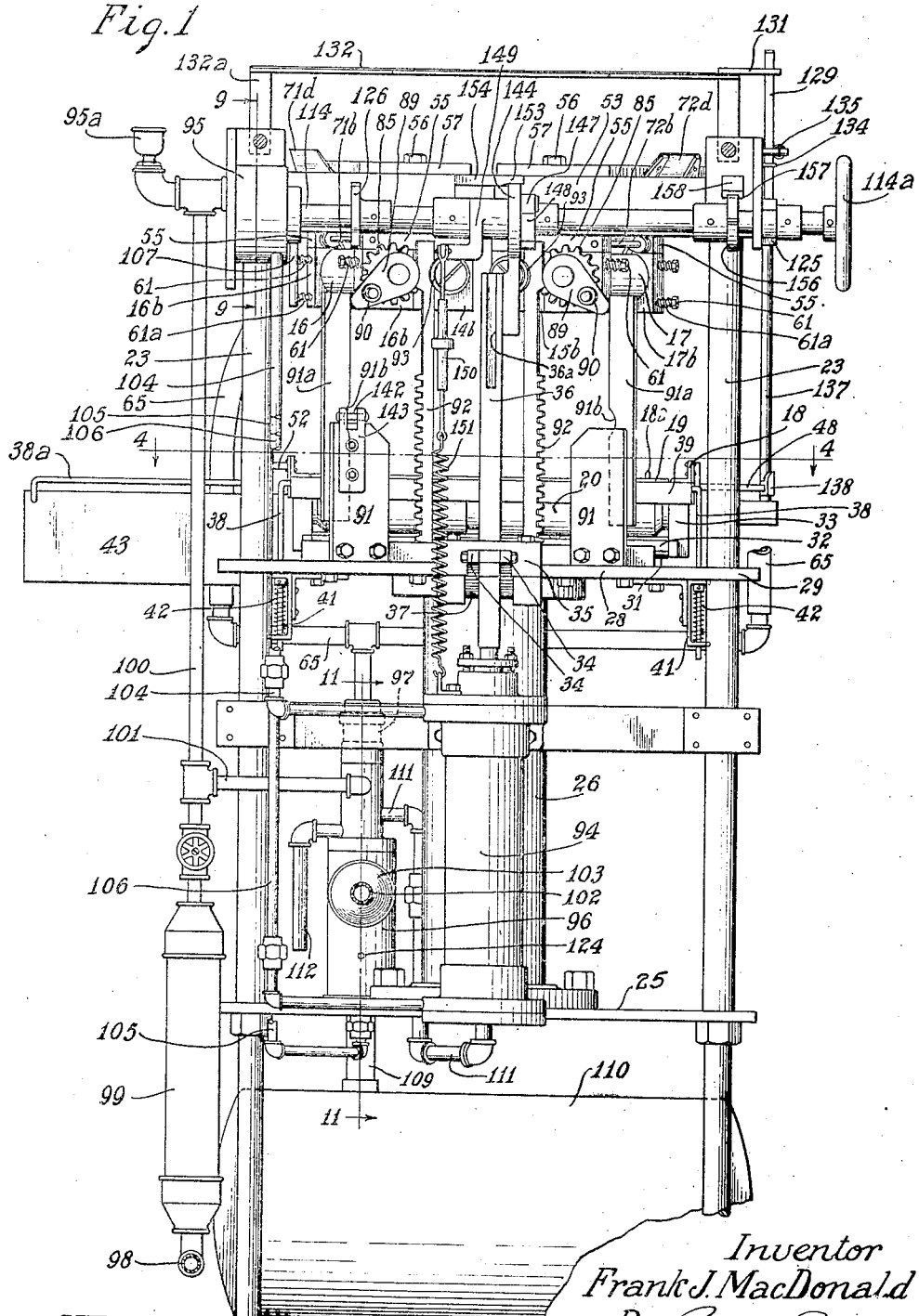

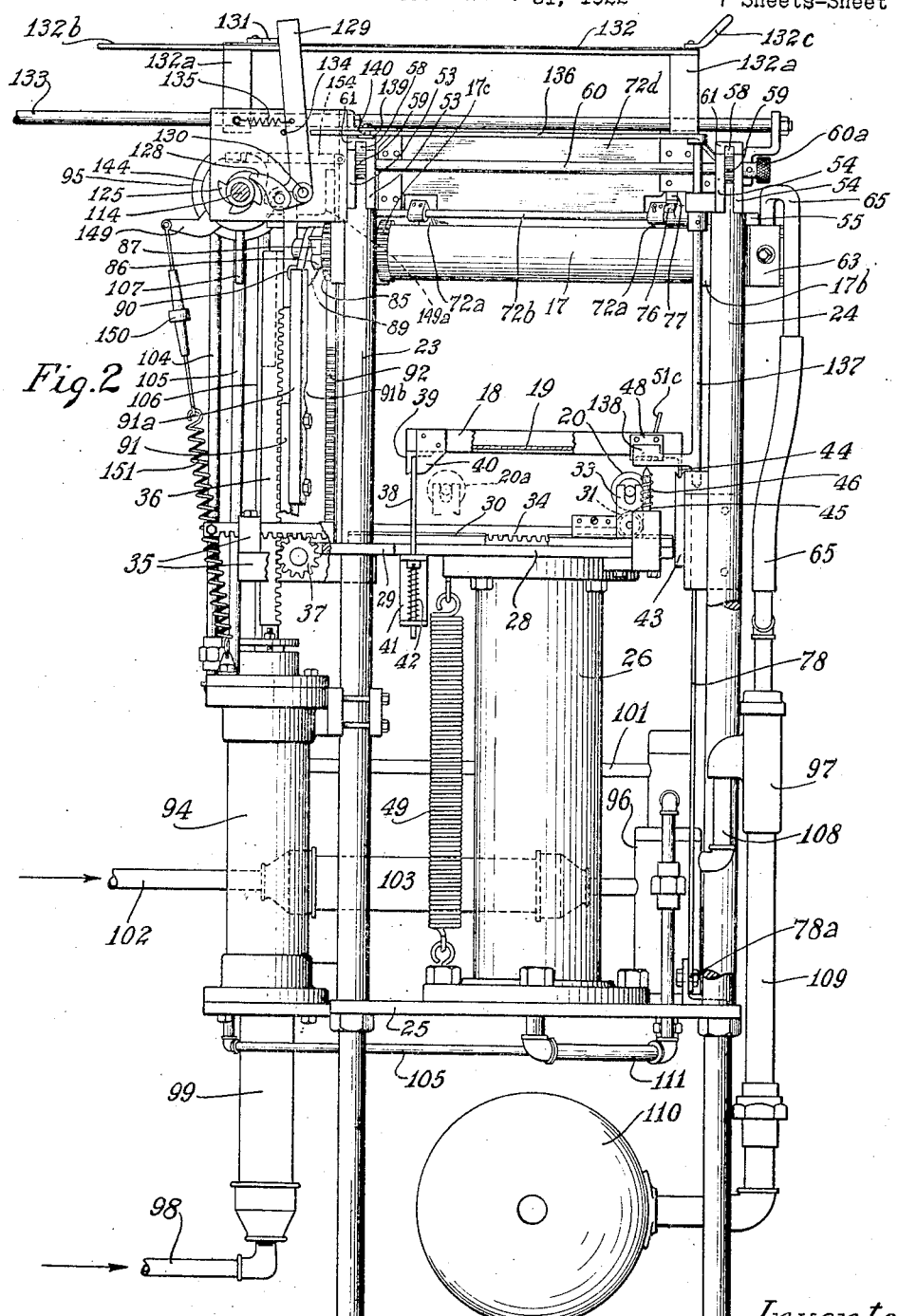

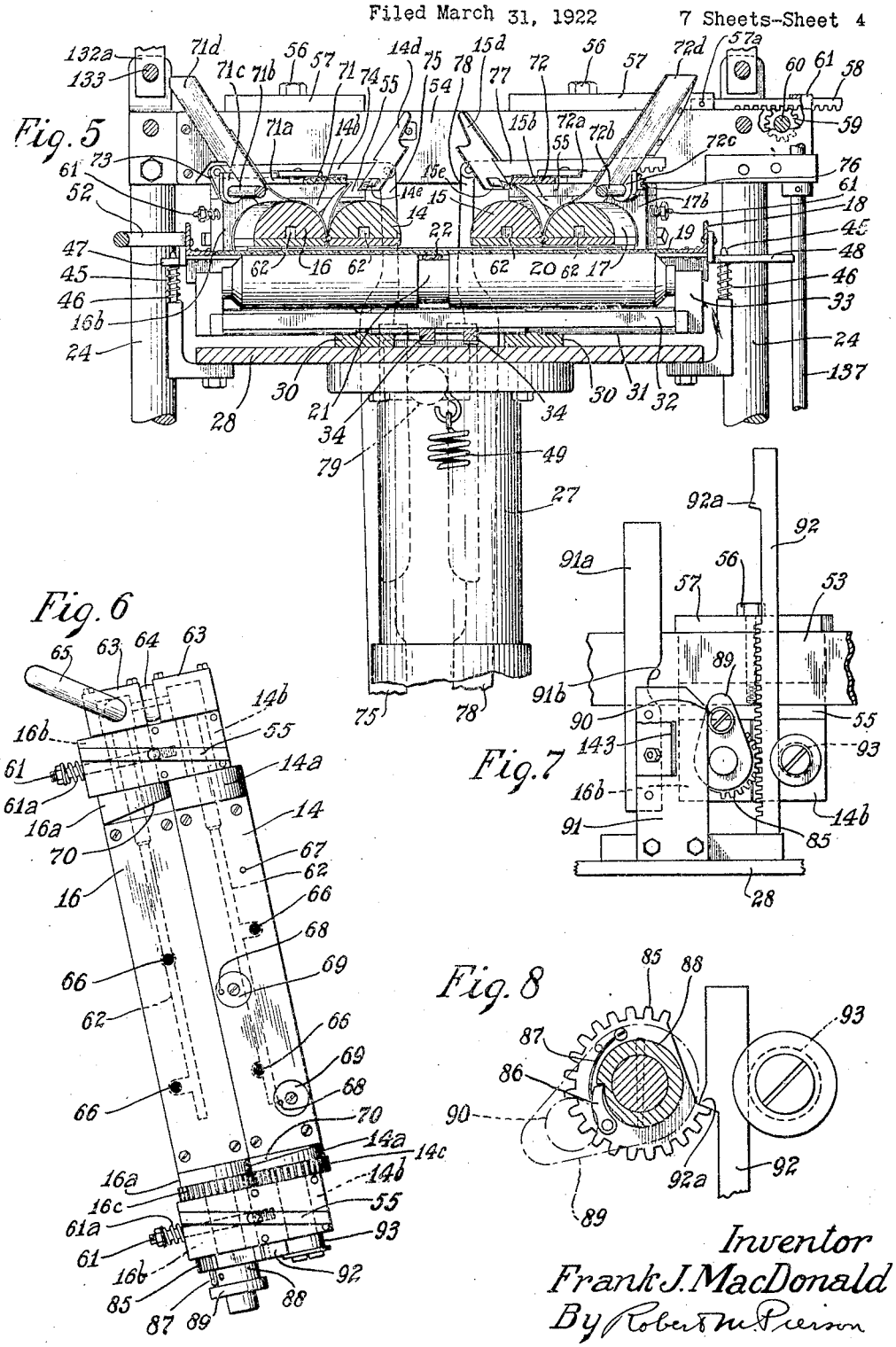

May 26, 1925.                                                    1,539,586
F. J. MacDONALD
METHOD AND APPARATUS FOR ASSEMBLING PIECES OF ADHESIVE SHEET MATERIAL
Filed March 31, 1922           7 Sheets-Sheet 5

Inventor
Frank J. MacDonald
By Robert M. Pierson
Atty.

May 26, 1925.
F. J. MacDONALD
1,539,586
METHOD AND APPARATUS FOR ASSEMBLING PIECES OF ADHESIVE SHEET MATERIAL
Filed March 31, 1922　　　7 Sheets-Sheet 6
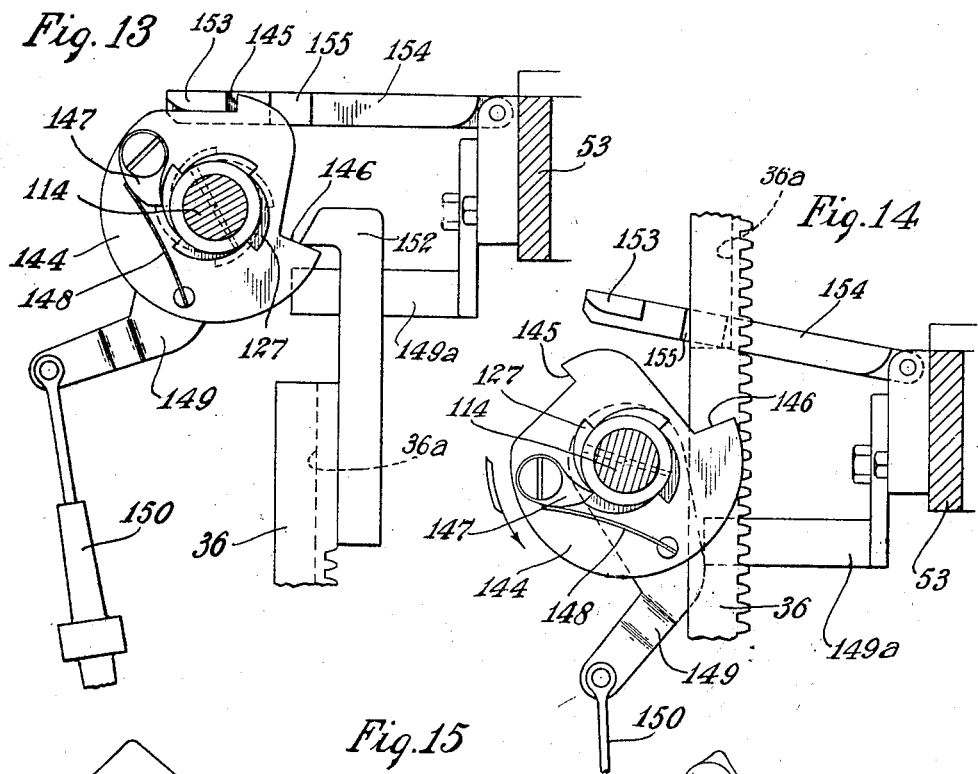
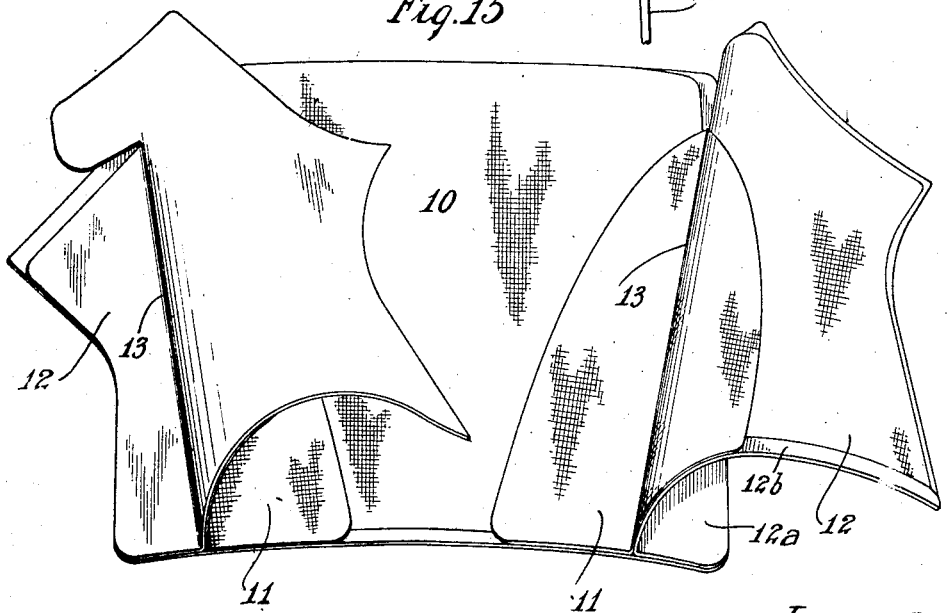
Inventor
Frank J. MacDonald
By Robert M Pierson
Atty.

May 26, 1925.  
F. J. MacDONALD  
1,539,586  
METHOD AND APPARATUS FOR ASSEMBLING PIECES OF ADHESIVE SHEET MATERIAL  
Filed March 31, 1922  7 Sheets-Sheet 7
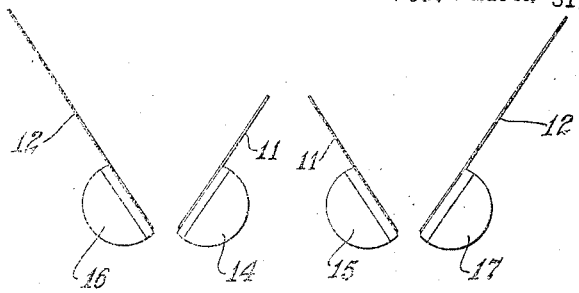
Fig.16
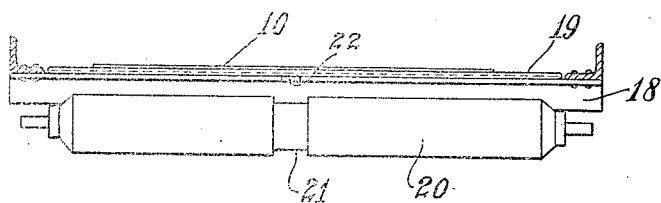
Fig.17
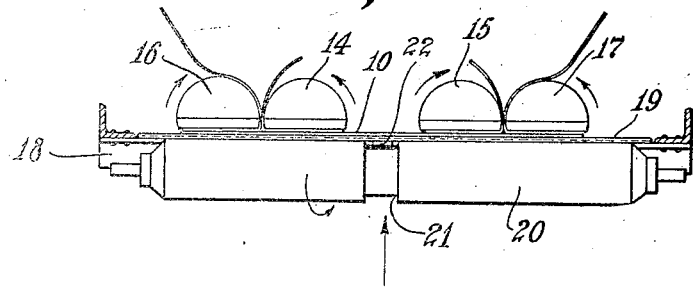
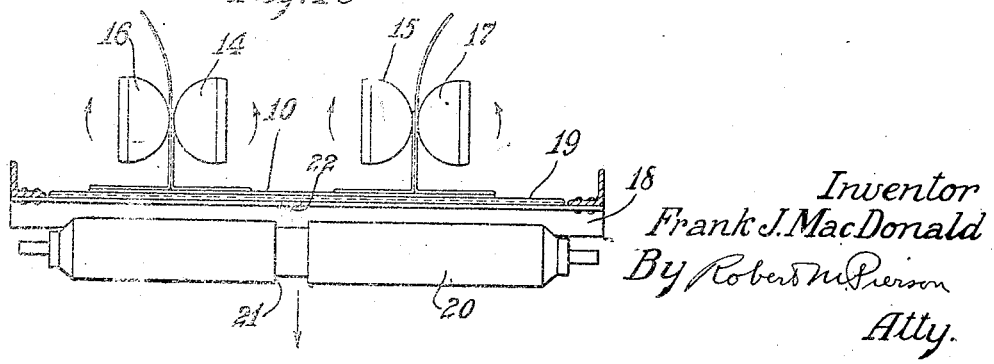
Inventor
Frank J. MacDonald
By Robert N. Pierson
Atty.

Patented May 26, 1925.

1,539,586

UNITED STATES PATENT OFFICE.

FRANK J. MACDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR ASSEMBLING PIECES OF ADHESIVE SHEET MATERIAL.

Application filed March 31, 1922. Serial No. 548,333.

*To all whom it may concern:*

Be it known that I, FRANK J. MACDONALD, a citizen of the United States, residing at Akron, in the county of Summit and State of Ohio, have invented a certain new and useful Method and Apparatus for Assembling Pieces of Adhesive Sheet Material, of which the following is a specification.

This invention relates to the art of assembling pieces of adhesive sheet material, such, for example, as the formed pieces of rubberized fabric constituting shoe parts in the manufacture of rubber footwear.

Such pieces of material, usually cut to form by a die, consist of fabric impregnated or coated with unvulcanized rubber in a tacky condition such that the pieces may be firmly stuck together, and they require to be accurately laid upon each other in the relation they are to occupy in the finished shoe, since the sticky rubber practically prevents sliding movement of one piece on another for the purpose of positioning them. It is also important that only such parts of the pieces as are to remain joined throughout the building of the shoe should be pressed together, as much delay and an inferior product may result from the adhesion of parts required to be separated.

My object is to provide an improved method and improved, largely automatic apparatus for work of this character whereby time and labor may be saved and an improved product obtained.

Of the accompanying drawings:

Fig. 1 is an elevation of a quarter-making machine embodying and adapted to carry out a preferred form of my invention.

Fig. 2 is an elevation of the same as viewed from the right of Fig. 1.

Fig. 3 is a plan view of the same, a cover plate thereon being broken away.

Fig. 4 is a horizontal section on line 4—4 of Fig. 1, with parts broken away.

Fig. 5 is a vertical section on line 5—5 of Fig. 3, of the work-contacting and associated parts of the machine, in pressing position.

Fig. 6 is a detached plan view of a pair of segmental, work-holding and pressing rollers.

Fig. 7 is a fragmentary elevation of a mechanism for turning the work-holding and pressing rollers, in one operative position.

Fig. 8 is a detailed view of a part of the same in a different operative position.

Fig. 13 is a detached view of additional means for turning said shaft.

Fig. 14 is a similar view of the same in a different operative position.

Fig. 15 is a perspective view of a rubber-shoe quarter-assembly as produced by the apparatus.

Fig. 16 is a diagrammatic view of the several work-contacting and pressing elements in their initial relative positions.

Fig. 17 is a similar view of the same in a later position.

Fig. 18 is a similar view of the same in a still later position.

*General description of work-manipulating parts.*

Figure 9:
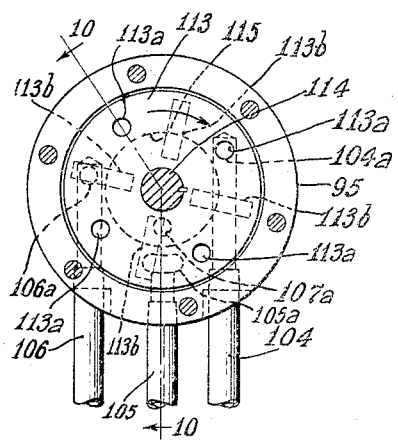
Fig. 9 is a section on line 9—9 of Fig. 1, of a distributor valve.

The apparatus shown in the accompanying drawings is adapted to produce a shoe-quarter assembly such as is shown in Fig. 15, in which 10 is the quarter proper, 11, 11 are the pockets, and 12, 12 the facings. Each of these pieces, as it is placed in the machine, consists of a flat, formed piece of rubberized fabric, the facings usually having on one side a sheet of rubber 12ᵃ the margins of which have been folded by hand over onto the opposite side of the facing, as shown at 12ᵇ (Fig. 15).

The machine is adapted to bend each pocket and its facing respectively to L-shape, to press the feet of the L's adhesively onto the quarter with their heels abutting each other, and to press the legs of each L-bent pocket and its L-bent facing adhesively together, the pockets and facings being so presented to each other and to the quarter that the lines of junction, 13, 13 (Fig. 15), diverge from each other.

The parts of the machine acting upon the work are diagrammatically shown in Figs. 16, 17 and 18, where 14, 15 are segmental, approximately semi-cylindrical rolls having means, elsewhere shown and hereinafter described, for sucking the pocket members 11 of the work against their flat faces, as indicated in Fig. 16, where the rolls are shown in work-receiving position. 16, 17 are similar rolls adapted to hold the facings 12 and to act simultaneously with the rolls 14, 15 in pressing parts of the pockets 11 and facings 12 onto the quarter 10, by contact of the flat faces of the rolls, as shown in Fig. 17, where the rolls have been turned to pressing position. The rolls 16, 17 are also adapted to coact respectively with the rolls 14, 15 in pressing the free portions of the pockets and facings together, by rolling contact of the curved surfaces of the rolls, when the rolls are turned from pressing position to work-receiving position, as shown in Fig. 18.

For raising the quarter 10 against the rolls 14, 15, 16, 17, a vertically movable frame 18 is provided, having stretched within it a flexible sheet or diaphragm 19, preferably of vulcanized, rubberized fabric, adapted to support in a flat condition a quarter 10 laid thereon. 20 is a roll, preferably rubber-covered, below said diaphragm, transverse to the rollers 14, 15, 16, 17, and adapted, by means hereinafter described, to be raised with the frame 18, pressed against the under side of the diaphragm, and run lengthwise of the semi-cylindrical rolls to press the quarter 10 against the pockets and facings, between the flexible diaphragm 19 and the flat faces of the semi-cylindrical rolls. The roll 20 is formed with a waist, as indicated at 21, to accommodate a cross-brace 22 of the frame 18.

*Quarter-supporting and rolling mechanism.*

The frame of the machine comprises four corner posts 23, 23, 24, 24, supporting the semi-cylindrical rolls and associated mechanism at their top and at a lower position supporting a horizontal plate or table 25. Mounted on said plate is a vertical fluid pressure cylinder 26 having therein an upwardly-acting plunger 27 (Fig. 5), on the upper end of which is mounted an elevator platform 28 having, at one side, perforate ears 29, 29, slidingly mounted upon the corner-posts 23, 23. Upon the upper face of said platform are secured a pair of medially-flanged run-ways or rails 30, 30, best seen in Figs. 2, 4 and 5, running in the same general direction as the semi-cylindrical rolls above them. On said rails is mounted a roll 31, having circumferential grooves fitting the flanges of said rails, said roll 31 supporting a carriage 32 for the roll 20, the journals of said roll 31 being mounted in brackets 33, 33 secured to the sides of said carriage and formed with upwardly extending forks in which the roll 20 is journaled, the latter being adapted to ride upon and be rotated by the roll 31, as shown most clearly in Fig. 2. The roll 31 is thus adapted to prevent sagging of the middle portion of the roll 20 such as might result if the roll 20 were simply journaled at its ends. 34, 34 are a pair of parallel, horizontal racks secured to the carriage 32 and extending therefrom through a guide-bracket 35 secured to the margin of the platform 28, said racks straddling a vertical rack 36 hereinafter referred to, both the vertical rack 36 and the horizontal racks 34 being meshed with a pinion 37 loosely journaled on the platform 29.

The quarter-supporting frame 18, in its lowermost position, is slidably seated at one side upon an arched rail 38 yieldingly mounted upon the elevator platform 28, said frame being provided with downwardly projecting guide members 39, 40, straddling said rail, and said rail having its downwardly bent end portions or legs mounted in guide brackets 41, 41 on the platform 28 and supported by helical springs 42, 42 mounted thereon within said brackets. At the opposite side, said frame, in its lowermost position, is supported upon a grooved rail 43 secured to the corner posts 24, said frame being formed with a downwardly projecting flange 44 (Fig. 2), adapted to slide in the groove of said rail. On the corners of the platform 28 adjacent said rail are mounted studs or dowels 45, 45, each having mounted thereon a helical spring 46, said studs being adapted to enter holes in respective ears or brackets 47, 48 projecting from the frame 18, when said frame is lifted from the rail 43 by the rising platform 28, the springs 42, 46 being adapted yieldingly to support said frame and permit the platform 28 to carry the roll 20 into contact with the under side of the diaphragm 19 after the latter is stopped by the semi-cylindrical rolls. 49 is a pull spring connecting the platform 28 with the fixed plate 25 below, for returning the platform 28 and parts carried thereby to their lowermost position upon the exhausting of the cylinder 26.

The diaphragm 19 is secured upon the frame 18 by pins such as 18ᵃ, 18ᵃ (Figs. 1 and 4), penetrating its margins, and is provided with gauges 50, 50 (Fig. 4) to facilitate the accurate placing of the quarter 10 thereon.

Lying upon the rear margin of the flexible, quarter-supporting diaphragm 19, as shown in Fig. 3, is a non-sticking shield or apron 51, secured to said diaphragm only along the edge of the latter, and adapted to receive a margin of the quarter thereunder to prevent said margin from sticking to the pockets and facings in that region. 51ᵃ is a presser foot or clamp having a hinge spring 51ᵇ adapted to press it downward upon the quarter to hold the latter in position upon the diaphragm, and having an upwardly projecting handle 51ᶜ (shown also in Fig. 2) for lifting it. A strip of stiff fabric 51ᵈ (Fig. 3) overlies the shank of said presser foot and has its ends secured to the apron 51, to lift the latter with the presser foot for the insertion of the quarter thereunder. The frame 18 is provided with a handle 52 for drawing it aside, on the rails 38, 43, for the placing of the quarter thereon and removal of the finished work therefrom. 38ᵃ is a rail mounted upon the frame of the machine in alignment with the rail 38 and adapted to support the frame when it passes from the rail 38.

*Pocket and facing manipulating mechanism.*

The semi-cylindrical or segmental rolls are formed with full-cylindrical, contacting end portions 14ᵃ, 15ᵃ, 16ᵃ, 17ᵃ and are journaled obliquely to the frame of the machine in blocks 14ᵇ, 14ᵇ, 15ᵇ, 15ᵇ, etc., adjustably supported beneath parallel pairs of bars 53, 53, 54, 54, connecting the corner-posts 23, 23 and 24, 24 respectively. The journal blocks of the inner rolls of each pair, 14, 15, are secured to the under faces of members 55, 55, having reduced portions fitting between the bars 53, 53 and 54, 54 respectively, against which bars the members 55 are clamped by screw bolts 56, 56 extending through bridge plates 57, 57 on top of said bars.

Pivoted at 57ᵃ to each of the bridge plates 57 for the rolls 15, 17, is a rack, 58, 58, said racks being adapted to be moved equally by pinions 59, 59, on a common shaft 60 journaled in the bars 53, 54 and provided with a hand knob 60ᵃ, for adjusting the rolls 15, 17 from or toward the rolls 14, 16 without changing their oblique relation. 61, 61 are bridge plates for holding the racks 58 in mesh with their pinions 59.

The journal blocks 16ᵇ and 17ᵇ of the rolls 16 and 17 are supported from stud bolts 61ᵇ, 61ᵇ projecting through them from the blocks 14ᵇ and 15ᵇ respectively, and are urged toward the adjacent blocks 14ᵇ, 15ᵇ by compression springs 61ᵃ, 61ᵃ, mounted upon the outer ends of said bolts and abutting retaining nuts thereon.

The semi-cylindrical rolls are formed with longitudinal cavities 62, 62 communicating at one end with the cavities of hollow blocks 63, 63 secured to the outer faces of their journal blocks, the cavities of the blocks 63 of each pair being connected through a yielding washer or gasket member 64, all as clearly shown in Fig. 6. 65 is a fluid conduit communicating with the cavity of one of the hollow blocks 63 for applying suction to the interiors of the semi-cylindrical rollers. The cavities of the latter open onto their flat faces through screened openings 66, 66, for sucking the stock against said faces. The pocket manipulating rolls 14, 15, are each provided with a guide or stop pin 67 and adjustable stop pins 68, 68, the latter being mounted on rotatable disks 69, 69 set in the flat faces of the pocket manipulating rolls, for facilitating the accurate positioning of the stock thereon.

The flat sides of the rolls, for convenience of construction, may be faced with plates, as indicated in Fig. 6, and the full cylindrical end portions of the rolls may be cut away obliquely, as indicated at 70, 70, to clear the frame 18 when the rolls are turned over from the positions shown in Fig. 6.

The rolls of each pair are provided at one end with intermeshed gears 14ᶜ, 16ᶜ and 15ᶜ, 17ᶜ, and are adapted to be driven by means presently to be described, and to be stopped alternately in the position of Figs. 3 and 16 and that of Figs. 5 and 17.

For positioning the facings 12 upon the rolls 16, 17, hinged plates 71, 72, each having an outline conforming to one edge of a facing, are adapted to lie upon the flat faces of said rolls respectively, said plates extending between variable-length radius arms 71ᵃ, 72ᵃ, secured to rock shafts 71ᵇ, 72ᵇ by means of ears 71ᶜ, 72ᶜ. Guide-plates 71ᵈ, 72ᵈ are provided, adapted slidingly to support and to guide the facings 12, 12 onto the rolls. The shaft 71ᵇ is provided with a rocking lever 73 connected by a link 74 with the upper end of a cam-lever 75 (Figs. 3 and 5) for lifting the plate 71 clear of the roll 16 to permit the rotation of the latter. The shaft 72ᵇ has secured thereon a pinion segment 76 (Figs. 2 and 5) meshed with a rack 77, the latter being pivoted to the top of a cam-lever 78 (Figs. 3 and 5) and held in mesh with said pinion segment by a roller 77ᵃ (Fig. 5) journaled on the guide plate 72ᵈ. The use of the rack and pinion permits ready adjustment of the rolls 15, 17, from or toward the rolls 14, 16. The cam levers 75 and 78 constitute a pair, having their lower ends pivoted to the frame of the machine as at 78ᵃ (Fig. 2) and being adapted to be spread apart, to lift the work-positioning plates 71, 72, by a stud 79 (Figs. 4 and 5) projecting from the platform 28, when the latter rises, and to be returned to their former positions by the weight of the plates 71, 72, when the stud 79 descends. The guide rail 43 for the quarter-supporting frame 18 is cut away at its middle portion, as indicated at 43ᵃ (Fig. 4), to receive the stud 79 in its lowermost position.

The work positioning plates 71, 72 conforming to the outlines of the facings, are preferable to pins for positioning the facings, since the latter should at no point extend beyond the margin of the quarter, as they might be permitted by the pins to do in case of imperfections in the outline of the facing such as frequently results from imperfect folding of the rubber sheet 12ª about the edges of the facing.

Pocket supporting and guiding plates 14ᵈ and 15ᵈ are provided for the rolls 14 and 15, and 14ᵉ and 15ᵉ are guide bars mounted on said plates for holding back the rear portions of the respective pocket members and preventing their premature contact with the facings as the rolls are turned to pressing position. The work-guiding plates 14ᵈ, 71ᵈ are secured to the bars 53, 54, while the similar plates 15ᵈ, 72ᵈ are secured to the clamping members 55, so as to be moved with the rollers 15, 17 when the latter are adjusted.

Roll-driving mechanism.

For driving the rolls 16, 17, and with them, (through the gears 16ᶜ, 14ᶜ and 17ᶜ, 15ᶜ), the rolls 14, 15, the nearer journals of the rolls 16 and 17 have rotatably mounted thereon mutilated gears 85, 85, (the details of one of said gears and associated parts being best shown in Figs. 6, 7 and 8), each of said gears carrying a pawl 86 backed by a spring 87 and adapted to engage a ratchet-notch on the hub 88 of a crank 89 secured on the end of said journal and provided at its end with a cam roller 90. Said crank is adapted to be turned from the position of Fig. 8 to the position of Fig. 7 by a cam member 91 mounted on the platform 28, when the latter is raised, to turn the semi-cylindrical rolls from the receiving position of Figs. 3 and 16 to the pressing position of Figs. 5 and 17, while the mutilated gear 85 is turned, with the pawl 86 running free, by a vertical rack 92 mounted upon said platform. The rack 92 is adapted on its down stroke, by driving the gear 85 in the opposite direction, with the pawl 86 engaged, to complete the revolution of the semi-cylindrical rolls, bringing them again to receiving position, and said rack is provided at its upper end, at a distance from its teeth, with a hook 92ª adapted to engage a terminal cog on the mutilated gear 85, as shown clearly in Fig. 8, accurately to position said gear when said rack reaches its lowermost position, to insure against jamming of its teeth with the rack upon the following upstroke of the latter. 93 is a flanged guide-roller for the rack 92, mounted on the projecting journal of the roll 14. 91ª is a stop for the crank 89, mounted upon the cam member 91, and adapted, by sliding contact, to prevent the over-running of said crank, as shown clearly in Fig. 1, but formed with a notch 91ᵇ to permit said crank to be turned when contacted by the upwardly moving cam member 91. Similar mechanism, designated by like numerals, are provided for driving the rolls 15, 17, except that in this instance the cam member 91, stop 91ª and rack 92 are adjustably mounted upon the plate 28, as is most clearly shown in Fig. 4, so that they may be set in the proper position to actuate the rolls 15, 17 when the latter are adjusted toward or away from the rolls 14, 16 as above described.

For reciprocating the carriage 32 upon the rails 30 of the platform 28, to run the roll 20 across the under face of the diaphragm 19 in the pressing operation, the vertical rack 36, above mentioned, is mounted upon a piston rod extending from the upper end of a cylinder 94 (Figs. 1 and 2) mounted upon the plate 25, said rack being, as heretofore described, in mesh with the pinion 37 journaled on the platform, and straddled by the horizontal racks 34, which latter are also in mesh with said pinion, the arrangement being such, as will be seen by reference to Fig. 2, that the upward movement of the platform 28, while the rack 36 remains in its lowermost position, will cause the racks 34 to draw the carriage 32 across said platform, to the left as there viewed, the roll 20 being carried, without contacting the diaphragm, to the relative position shown in dotted lines at 20ª, when the platform has raised said diaphragm against the semi-cylindrical rolls. The frame 18, as above described, is yieldingly supported, so that further upward movement of the platform may be had, bringing the roll 20 against the diaphragm, across which, from left to right, it is adapted then to be run by the upward stroke of the rack 36, the platform 28 and parts carried thereby and the rack 36 then descending together without relative movement, except that the springs 42, 46 lift the frame 18 from the roller 20.

Fluid-pressure system.

The fluid pressure system for actuating the cylinders 26 and 94 and applying suction to the semi-cylindrical rolls comprises a distributor valve 95, a fluid-pressure-actuated control valve 96, and an ejector 97. 98 (Fig. 1) is an incoming fluid-pressure supply-line in which is an air drier 99 and from which a branch 100 leads to the distributor valve 95 and a branch 101 leads to the control valve 96. 102 (Figs. 1 and 2) is a second incoming fluid-pressure supply-line, having therein an air drier 103 and leading to the control valve 96. From the distributor valve 95 a pipe 104 leads to the top of the rack cylinder 94, a pipe 105 leads to the bottom of the control valve 96, and a pipe 106 leads to the bottom of the rack cylinder 94. 107 is an exhaust from said distributor valve and 95ª is an oil cup from which oil is adapted to be carried into the distributor valve to lubricate the latter, by the air current from the pipe 100. The suction pipes 65 heretofore referred to connect the semi-cylindrical rolls with the ejector 97, which is actuated by a pipe 108 from the control valve 96 to produce a suction in said rolls, and the exhaust 109 of said ejector leads to a muffler and oil separator 110. From the top of the control valve 96 a pipe 111 leads to the bottom of the elevator cylinder 26, and 112 is an exhaust for said cylinder, leading from said control valve (Fig. 1).

The distributer valve 95 (Figs. 9 and 10) comprises a casing enclosing a chamber within which is a rotary valve-disc 113, secured upon an axial shaft 114 extending through the front wall of said casing, said disc being held flatly against the front wall of said chamber by a compression spring 115 seated in the rear wall of the casing and bearing against the rear end of said shaft. The incoming branch 100 enters said chamber at the rear of said disc, and the latter is formed with four perforations or ports 113ª, 113ª, near its outer periphery, positioned 90° apart, and registrable with ports 104ª, 105ª and 106ª in the front wall of the casing, with which latter ports the pipes 104, 105 and 106 respectively are in communication. The front face of the disc 113 is formed with four radial grooves 113ᵇ, 113ᵇ, terminating short of its inner and outer peripheries, registrable with the ports 104ª, 105ª and 106ª, and positioned midway between the ports 113ª, thus being 90° apart, and the front wall of the chamber is recessed about the shaft 114, as indicated at 115ª, said recess being constantly in communication with all of said grooves and with the port 107ª of the exhaust 107.

Figure 10:
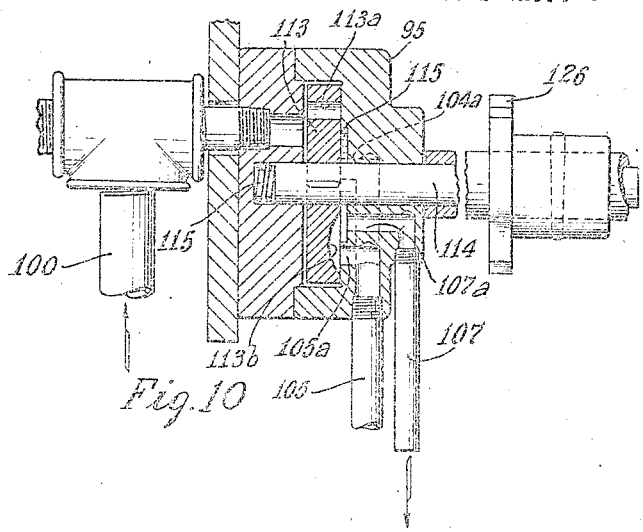
Fig. 10 is a section on line 10—10 of Fig. 9.

The ports 104ª, 105ª and 106ª, as shown, are so positioned that when the disc 113 is turned through 90° in the direction indicated by the arrow in Fig. 9, in three successive movements of substantially 21½°, 23½° and 45° respectively, one complete cycle of operations of the machine is effected, as will presently be described.

The control valve 96 comprises a casing, in the upper part of which is mounted a double seated, spool-shaped, poppet-valve member 116, made in two parts held together by a nut 116ª and having opposed, conical faces adapted to seat alternately upon seats formed on the upper and lower faces respectively of an annular flange 117 within the casing, and thus to connect the pipe 111, which leads to the elevator cylinder 26, with the supply pipe 101, while closing it from the exhaust 112, and alternately to connect the said cylinder pipe 111 with said exhaust 112 while shutting it off from said supply pipe.

Pressure from the supply pipe 101, entering the casing above said valve member, constantly urges the latter downward, toward its cylinder-exhausting position, and for lifting it to cylinder-charging position, against said pressure, its lower end is formed with an axial recess adapted to receive and seat upon a pin 118 formed on the upper end of a slide-valve member 119 mounted in the lower part of the casing. Said slide valve member has on its lower end a piston 120 mounted in a cylinder recess 121 formed in the lower part of the casing and 121ª is a helical spring on said member, within said recess, adapted to urge said piston downward, the pressure from the supply pipe being balanced against a slide-valve disc 122 and a guide-disc 123 on said slide-valve member, between which discs said pipe enters the casing. For raising said slide-valve member and thus putting the supply pipe 102 in communication with the ejector pipe 108 when the disc 122 passes the mouth of the latter, the pipe 105 from the distributer valve 95 enters the cylinder-recess 121 below the piston 120. 124 is a vent from the upper part of said cylinder recess, which is provided in order that undue air pressure within said recess above said piston may not be built up, as by leakage past the disc 123, and prevent the rising of the piston.

*Distributer-valve-actuating-mechanism.*

For turning the shaft 114, and with it the distributer-valve disc 113, through the successive movements of 21½, 23½, and 45 degrees for each cycle of operations, said shaft has secured thereon, for producing said movements respectively, a ratchet 125, a star-wheel 126 and a second ratchet 127. The first ratchet, 125, is adapted to be driven by a pawl 128 (Fig. 2) mounted on the lower end of a lever 129 fulcrumed at 130 on the frame of the machine, the upper end of said lever being adapted to be struck by a lug 131 projecting from the side of a cover or guard plate 132 for the machine, said guard plate having legs 132ª, 132ª slidingly mounted upon rails 133, 133 and having handles 132ᵇ, 132ᶜ at its respective ends, for sliding it over the machine to insure that the operator's hands will be out of danger when the machine starts, the lug 131 being adapted in this movement to strike the lever 129 and thereby, through the pawl 128 and ratchet 125, drive the shaft 114 through its first movement, of about 21½ degrees, as stated. 134 is a stop pin for the lever 129 and 135 is a pull spring for returning said lever against said stop pin when the cover-plate 132 is again withdrawn from the machine.

For assuring that the machine will not be started until the quarter-supporting frame 18 is in position, a horizontal latch bar 136 is secured to the top of a vertical pivot-post 137 rotatably mounted in the frame of the machine, the lower end of said pivot-post having a radius arm 138 adapted to be struck by the ear or bracket 48 of the frame 18, as seen most clearly in Fig. 4, to swing the latch bar 136 aside from the lever 129 when the frame 18 is slid upon the rails 38, 43, into operative position, permitting said lever 129 to be actuated by the lug 131, the outer end of said latch bar sliding, upon a bracket 139, against a stop-pin 140. 141 (Fig. 4) is a spring adapted to turn said bar back to latching position, where its end face is in position to abut the lever 129, when the frame 18 and cover 132 are withdrawn.

Figure 12:
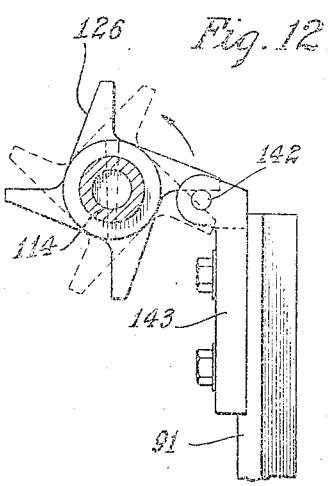
Fig. 12 is a detached view of a shaft and star wheel thereon, and driving means therefor, for actuating the distributor valve.

For driving the star-wheel 126, a pin 142 (Figs. 1, 3 and 12) is mounted between the forks of a bracket 143 secured to the nearest of the cam members 91, said pin being adapted to engage one of the arms of the star-wheel near the end of the upward movement of the platform 28.

For driving the ratchet 127, a plate 144 formed with a latching shoulder 145 and a driving shoulder 146 on its outer periphery, as shown clearly in Figs. 13 and 14, is rotatably mounted upon the shaft 114 and provided with a pawl 147 backed by a spring 148 and associated with said ratchet. 149 is a lever secured to said plate and having its outer end connected by a turn-buckle 150 and a spring 151 with the upper end of the rack cylinder 94 (Figs. 1 and 2), said spring being of sufficient strength to turn the shaft 114. 149$^a$ is a stop for said lever 149. 152 is a hook secured to the top of the rack 36 and adapted upon the descent of the latter to engage the shoulder 146 of the plate 144 and thereby turn said plate against the action of the spring 151, the pawl 147 running free, until the latching shoulder 145 of said plate passes a lug 153 formed on a latch member 154 pivoted to the frame of the machine and adapted to ride upon said plate, as shown in Fig. 13. For lifting said latch member to permit said spring to turn the shaft, the rack 36 is formed at its back with a groove 36$^a$ adapted to receive a lug 155 formed on the latch member 154, the bottom face of said groove being adapted to strike said lug and lift the latch member 154 at the top of the stroke of said rack, releasing the plate 144, as shown in Fig. 14. The shaft 114 is provided with a hand wheel 114$^a$ (Fig. 1), for turning it independently of the automatic driving mechanism, on occasion.

To assure the stopping of the shaft 114 in the proper position at the end of each cycle of operations, a latching member 156 is secured thereon, (Fig. 1), said member being formed with four notches, 90° apart, on its periphery, said notches being adapted in turn to receive a latching pawl 157 on the end of a spring arm 158 projecting from the frame of the machine, but said notches are formed with sloping sides so that said pawl may be dislodged by forcible turning of the shaft.

With the construction shown, an air pressure of 60 lbs. to the square inch in both the supply pipes 98 and 102 has been used, and they may therefore lead from a single source, but it is desirable that the pipe 102 for the ejector be of substantial length, of large capacity, or equipped with a storage reservoir in order that the pressure therein may not be too quickly reduced by the escape of air through the ejector.

Operation.

The frame 18 is withdrawn, upon the rails 38, 38$^a$ and 43, and the quarter 10 is placed thereon, between the guides 50, and its end inserted under the apron 51 and presser foot 51$^a$ (Figs. 3 and 4). This is preferably done by one operator, while another withdraws the cover 132 and places the pocket members 11 and facings 12 upon the semi-cylindrical rollers in the positions shown by dot and dash lines in Fig. 3. The frame 18 is then slid back into operative position, its ear 48 striking the arm 138 of the pivot post 137, thereby swinging the latching bar 136 out of the way of the lever 129. The cover 132 is then slid back over the machine, its lug 131 striking said lever 129 and, through the pawl 128, turning the shaft 114 through 21½°.

Figure 11:
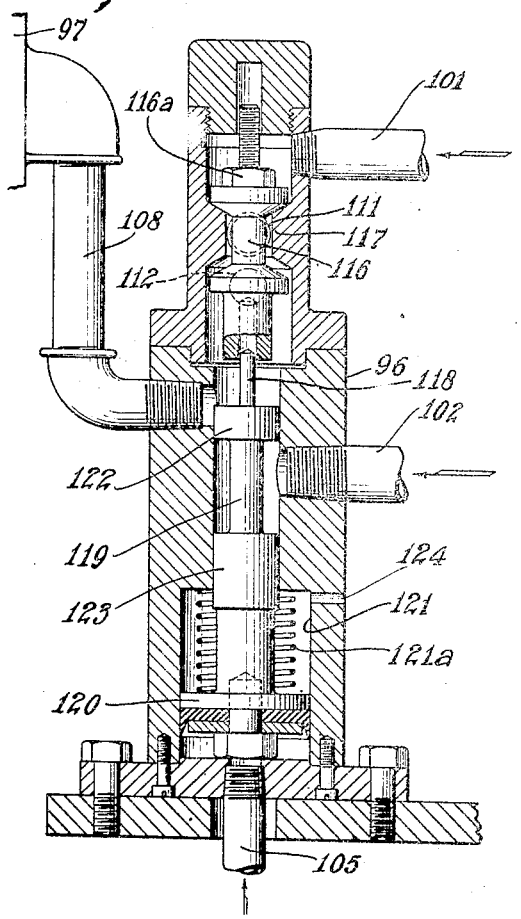
Fig. 11 is a vertical sectional view of a control valve, on line 11—11 of Fig. 1.

At the beginning of this movement of said shaft, the distributor valve disc 113 is in the position shown in Fig. 9; the control valve 96 is in the position shown in Fig. 11, the elevator cylinder 26 being exhausted through the pipes 111, 112, and the port 105$^a$ of the valve actuating pipe 105 being in registry with one of the exhaust grooves 113$^b$ of said disc; the rack 36 is in its lowermost position, the bottom of its cylinder 94 being exhausted through the pipe 106 and the exhaust 107 of the distributor valve, the port 106$^a$ of said pipe being registered with one of the exhaust grooves 113$^b$; the upper part of said rack cylinder is charged, the port 104$^a$ of the pipe 104 being registered with one of the ports 113$^a$ of said valve disc; and the semi-cylindrical rollers are without suction, as the slide-disc 122 in the control valve 96 (Fig. 11) shuts off the supply pipe 102 from the ejector 97.

This first movement of the shaft 114 so turns the distributor-valve disc 113 as to register its adjacent port 113$^a$ with the port 105$^a$ of the control-valve-actuating pipe 105, thereby lifting the slide-valve member 119 of the control-valve 96 (Fig. 11), connecting the supply pipe 102 with the ejector 97, and thereby creating a suction in the semi-cylindrical rolls; said sliding-valve member 119 also lifts the poppet-valve member 116, closing the exhaust 112 and charging the elevator cylinder 26 through the pipes 101 and 111. The ports 104$^a$ and 106$^a$ of the rack-cylinder's pipes are at this time out of registry with both the valve-disc ports 113ª and the exhaust grooves 113ᵇ, but the upper end of the rack cylinder 94 remains charged, holding the rack 36 in its lowest position while the cylinder 26 raises the platform 28.

As the platform 28 rises, its stud 79 (Figs. 4 and 5) spreads apart the cam-levers 75, 78, lifting the work-positioning plates 71, 72 clear of the semi-cylindrical rolls, to permit the free turning of the latter, while the pockets 11 and facings 12 are held in position on said rolls by the suction therein. When the cam-members 91 on the rising platform 28 strike the cam rollers 90 on the cranks 89, they quickly turn the semi-cylindrical rolls from the positions shown in Figs. 3 and 16 to those of Figs. 5 and 17, bending the pockets and facings to L form and bringing the heels of the L's together, with the feet thereof all lying in the same plane to receive the quarter, while the racks 92, engaging the mutilated pinions 85, turn the latter, with their pawls 86 running free.

During the rising movement of the platform 28, the pinion 37, running on the rack 36, actuates the racks 34 to draw the carriage 32 across said platform. When the latter reaches its uppermost position, the roll 20 is brought against the underside of the diaphragm 19, due to the yielding of the springs 42, 46, and the pin 142 (Figs. 1, 3 and 12), striking the star-wheel 126, so turns forward the distributor-valve disc 113 as to register one of its ports 113ª with that of the pipe 106 and one of its exhaust grooves 113ᵇ with the port of the pipe 104, thus raising the rack 36, which, through the pinion 37 and racks 34, drives the carriage 32, with the roll 20 journaled thereon, back across the platform 28, while said roll is firmly pressed against the under side of the diaphragm 19 by the cylinder 26. The quarter 10 is thus pressed adhesively against the adjacent portions of the pockets and facings, the latter being backed by the flat faces of the semi-cylindrical rolls, and the diaphragm 19, being held in position by the frame 18 in which it is mounted, prevents creeping of the quarter, which sometimes results from the application of a pressing roller directly to a piece of stock. The port 105ª of the pipe 105 being oblong, as shown, (Fig. 9) the suction in the semi-cylindrical rolls and the pressure in the cylinder 26 is maintained during the pressing movement of the roll 20 as well as during the turning of the semi-cylindrical rolls to pressing position.

Near the end of the pressing movement of the roll 20, as the rack 36 reaches its highest position, the bottom face of its groove 36ª strikes the lug 155, as shown clearly in Fig. 14, lifting the pivoted latch member 154 and thereby releasing the plate 144, which is thereupon turned, and with it the shaft 114 and distributor-valve disc 113, through 45°, by the spring 151. The disc 113, having been turned, by the three successive movements described, through 90°, its ports 113ª and exhaust grooves 113ᵇ, being respectively 90° apart, again occupy positions as shown in Fig. 9, whereupon, the pipe 105 being exhausted, the spring 121ª in the control valve 96 (Fig. 11) forces the slide-valve member 119 downward, shutting off the ejector 97 from the supply pipe 102, to break the vacuum in the semi-cylindrical rolls and release the work. At the same time pressure from the pipe 101 forces downward the poppet-valve member 116, exhausting the elevator cylinder and thereby permitting the platform 28 to descend under its own weight and the pull of the spring 49. Meanwhile the rack 36 is lowered, the upper end of its cylinder being charged and its lower end exhausted, through the distributor valve, said rack and the platform descending together without actuating the racks 34. When said platform reaches its lowest position, the frame 18 is slid therefrom as before, the finished work removed from said frame, and the operation as described is repeated.

Various modifications may be resorted to without departing from the scope of my invention, and I do not wholly limit my claims to the specific construction or course of procedure shown and described.

I claim:

1. The method of assembling pieces of sheet material having a tacky rubber surface which comprises moving a plurality of said pieces, with relation to each other, into the relative positions they are to occupy in the finished structure, by engagement with one face only of each piece, their opposite faces being exposed in said positions, and applying another piece to the exposed faces of the said pieces in common while thus holding them in said positions.

2. The method of assembling members of a rubber shoe which comprises so holding respective members by engagement with one face only of each member that a free portion of the member extends beyond its holding means, by such engagement moving said members with relation to each other into the relative positions they are to occupy in the shoe, and pressing a third member against the held portions of the said members while they are held in said positions.

3. The method of assembling adhesive pieces of sheet material which comprises so bringing together three of said pieces, by engagement with one face only of each piece, that the three have substantially a common line of contact and each contacts face-to-face with the other two on opposite sides of said line.

4. The method of assembling members of a rubber shoe which comprises holding a plurality of said members against respective supports by suction, so moving said supports with relation to each other as to bring said members into the relative positions they are to occupy in the shoe, and pressing another member against the said members while the latter are so held in said positions.

5. The method of assembling pieces of sheet material comprising tacky, unvulcanized rubber which comprises holding one of said sheets against a flat surface by suction, applying a second sheet to the first sheet, and passing a roller over the assembled sheets to press them together against said flat surface.

6. The method of assembling a shoe quarter, pocket and facing composed of rubberized fabric which comprises presenting said pocket and facing to respective supports, holding a part of each against its support by suction while moving said supports to bring said parts into juxtaposition, with the free portions of the pocket and facing adjacent each other, and pressing said quarter against said suction-held parts.

7. The method of assembling adhesive sheets of material which comprises presenting two of said sheets to respective supports, holding a part of each against its support by suction while moving said supports to bring said parts into juxtaposition substantially in the same plane with the free portions of said sheets adjacent each other and projecting laterally from said held parts, pressing a third sheet against said suction-held parts, breaking said suction, and pressing said free portions together.

8. The method of assembling adhesive sheets of material which comprises presenting two of said sheets to respective supports, holding parts of said sheets snugly against said supports while moving the latter to bring said parts into juxtaposition in predetermined relation to each other, with the free portions of said sheets adjacent each other and projecting laterally from said held parts, and pressing a third sheet against said held parts.

9. The method of assembling adhesive sheets of material which comprises presenting two of said sheets to respective supports, holding parts of said sheets snugly against said supports while moving the latter to bring said parts into juxtaposition with the free portions of said sheets adjacent each other and projecting laterally from said held parts, pressing a third sheet against said held parts, and pressing said free portions together.

10. Apparatus for assembling adhesive sheets of material, said apparatus comprising supports adapted to hold parts of respective sheets snugly thereagainst, means for moving said supports to bring said held parts into juxtaposition with the free portions of said sheets adjacent each other and extending laterally from said held parts, and means for pressing a third sheet against said held parts.

11. Apparatus for assembling adhesive sheets of material, said apparatus comprising a pair of supports adapted to hold parts of respective sheets snugly thereagainst, means for moving said supports to bring said held parts into juxtaposition with the free portions of said sheets adjacent each other and extending laterally from said held parts, means for pressing a third sheet against said held parts, and means for pressing said free portions together.

12. In apparatus for assembling adhesive sheets of material, the combination of a pair of flat-sided rolls, means for holding sheets of stock against the flat sides of said rolls, and means for turning said rolls and for stopping them in positions such that their flat sides lie substantially in the same plane.

13. In apparatus for assembling adhesive sheets of material, the combination of a pair of segmental rolls adapted to hold sheets of stock on their flattened sides, means for intermittently driving said rolls, one of their stopping positions being such that their flattened sides are accessible from one side of the pair and another stopping position being such that their flattened sides lie in predetermined relative positions at the other side of the pair.

14. In apparatus for assembling adhesive sheets of material, the combination of a pair of coacting, segmental presser rolls, means for intermittently driving said rolls, and means for so holding a sheet of stock in fixed relation on each of said rolls that portions of the respective sheets will be pressed against each other by the cylindrical faces of said segmental rolls and adjacent portions extending over the receding faces of said segmental rolls will not be so pressed together.

15. In apparatus for assembling adhesive sheets of material, the combination of a pair of coacting, segmental presser rolls adapted to hold sheets of stock on their flat sides, means for intermittently driving said rolls, one of their stopping positions being such that their flat sides lie substantially in the same plane, and means for pressing a sheet of stock against the sheets held on said flat sides.

16. Apparatus for assembling adhesive sheets of material, said apparatus comprising members adapted to hold respective sheets of stock by engagement with one face only of the sheet, means for relatively moving said members to present said sheets in determined relative positions, and means for applying another sheet to the said sheets in common while they are held in such positions.

17. In apparatus for assembling adhesive sheets of material, a roll having its rolling surface interrupted by a flattened face, said roll being adapted to hold a sheet of said material against said face by suction, means for intermittently driving said roll and stopping it with said flattened face in a determinate position, and means for pressing a second sheet of stock against a sheet held against said face while the roll is so stopped.

18. Apparatus for assembling adhesive sheets of material, said apparatus comprising a vacuum applying member having a flat face and being adapted to hold a sheet of stock against said face by suction, means for presenting a second sheet to said sheet while the latter is so held, and a roller adapted progressively to press said sheets together against the flat face of said vacuum-applying member.

19. In apparatus for assembling adhesive sheets of material the combination of a pair of vacuum-applying members having flat faces and adapted to hold sheets of stock against said faces by suction, means for moving said members to bring said flat faces into juxtaposition substantially in the same plane, and means for pressing a sheet of stock against the aforesaid sheets while the latter are so held on said flat faces.

20. In apparatus for assembling adhesive sheets of material, the combination of a pair of rotary members each having a flattened suction face adapted to hold a sheet of stock by suction, means for periodically turning said members and stopping them with said faces in juxtaposition and in predetermined relation to each other, and means coacting with said members for pressing a sheet of stock against the sheets so held by said members.

21. In apparatus for assembling adhesive sheets of material, the combination of a pair of flat-sided presser rolls, vacuum applying means for holding sheets of stock against the flat sides of said rolls, and means for turning said rolls and for stopping them in positions such that their flat sides lie substantially in the same plane.

22. In apparatus for assembling adhesive sheets of material, the combination of a pair of presser rolls each having its rolling surface interrupted by a flattened face, means for applying suction through each of said rolls to the suction face thereof, and means for intermittently driving said rolls, one of their stopping positions being such that their suction faces are accessible from one side of the pair, and another stopping position being such that their suction faces lie in determinate relative positions at the other side of the pair.

23. In apparatus for assembling adhesive sheets of material, the combination of a pair of coacting, segmental presser rolls having suction apertures on their flattened faces, and means for intermittently driving said rolls.

24. In apparatus for assembling adhesive sheets of material, the combination of a rotary member having a suction face adapted to hold a piece of stock by suction and to carry the same to a predetermined pressing position, means for intermittently driving said rotary member and stopping it with the stock thereon in said pressing position, and a slidably mounted member adapted to present a second sheet of stock in predetermined relation to the first said sheet while the latter is held in pressing position by said rotary member.

25. In apparatus for assembling adhesive sheets of material, the combination of a presser member adapted to hold exposed a sheet of stock, a flexible member adapted to support a sheet of stock laid thereon, means for moving said members toward each other in predetermined relation to present said sheets to each other, and a roller adapted to run on the reverse side of said flexible member to apply pressure progressively to said sheets.

26. In apparatus for assembling adhesive sheets of material, a pressing device comprising a presser member and a flexible diaphragm adapted to bear upon opposite sides of the work, a roller adapted to run on the reverse side of said diaphragm to press it against the work, and means for holding said diaphragm against creeping with relation to said presser member.

27. In apparatus for assembling adhesive sheets of material, the combination of a pair of segmental presser rolls adapted to hold respective pieces of stock with margins thereof lying against their flattened sides, means for turning said rolls so that their flattened sides lie below, with said margins adhering thereto and with other parts of said sheets extending upward between said rolls, a vertically movable member below said rolls, a flexible member supported by said vertically movable member and adapted to present a sheet of stock laid thereon to the aforesaid sheets, and a roll adapted to run upon the under side of said flexible member.

28. In apparatus for assembling adhesive sheets of material, the combination of a presser member adapted to hold a sheet of stock on its under surface, a rising platform thereunder, a flexible diaphragm yieldingly mounted on said platform, a roll mounted on said platform and adapted to be brought into contact with the under side of said diaphragm by upward movement of said platform after said diaphragm has been stopped by said presser member, and means for running said roll on the under side of said diaphragm.

29. In apparatus for assembling adhesive sheets of material, the combination of a pair of segmental, intermittently-driven rolls having a stopping position such that their flattened faces are accessible from one side of their nip, another stopping position such that their flattened faces lie in predetermined relation to each other at the other side of their nip, guiding means lying in extension of said flattened faces when said rolls are stopped in the first said position, means on said flattened faces for positioning the work thereon, and means for applying a suction to the work through said flattened faces.

30. In apparatus for assembling adhesive sheets of material, the combination of a pair of segmental, intermittently-driven rolls having a stopping position such that their flattened faces are accessible from one side of their nip, another stopping position such that said faces lie in predetermined relation to each other at the other side of their nip, means for holding the margins of sheets of stock against said flattened faces while the rolls are turned from the first to the second position, and guiding means for the free portion of said sheets.

31. In apparatus for assembling adhesive sheets of material, a pair of intermittently driven presser rolls each having its rolling surface interrupted by a substantially flattened face and having full-cylindrical portions at the ends of said face, and means for yieldingly urging said rolls together.

32. In apparatus for assembling adhesive sheets of material, the combination of two pairs of horizontally alined, intermittently driven, segmental, presser rolls having a stopping position such that their flattened faces are all accessible from above and another stopping position such that their flattened faces all lie below and in predetermined relation to each other, and means for adjusting one pair of said rolls from or toward the other pair.

33. In apparatus for assembling adhesive sheets of material, a pair of segmental rolls, slidably mounted journal blocks for one of said rolls, journal blocks for the other roll slidably mounted upon the journal blocks of the first roll, and yielding means for urging said rolls together.

34. In apparatus for assembling adhesive sheets of material, the combination of a pair of segmental, intermittently driven presser rolls, having a stopping position such that their flattened faces are accessible from one side of their nip, a pivoted work positioning member adapted to lie on the flattened face of one of said rolls while the latter is in said position, means for sucking a sheet of stock against said flattened face, and operatively connected means for driving said rolls from said position and for lifting said pivoted member from said roll to permit the free turning of the latter.

35. In apparatus for assembling adhesive sheets of material, the combination of a pair of segmental, intermittently driven presser rolls, having a stopping position such that their flattened faces are accessible from one side of their nip, a pivoted work-positioning member adapted to lie on the flattened face of one of said rolls while the latter is in said position, means for sucking a sheet of stock against said flattened face, end mountings for said rolls, means for securing said end mountings in different positions, a rack-and-pinion device for turning said pivoted member, and operatively connected means for driving said rolls and for actuating said rack-and-pinion device.

36. In apparatus for assembling adhesive sheets of material, the combination of two pairs of horizontally aligned, intermittently driven, segmental, presser rolls, slidable end mountings for one pair of said rolls, and a rack and pinion mechanism common to said slidable end mountings for adjusting the same.

37. Apparatus for assembling adhesive sheets of material, said apparatus comprising intermittently driven, rotary members adapted in one of their stopping positions to receive respective sheets of material and in a second stopping position to hold said sheets with parts thereof exposed in predetermined relation to each other, means for pressing another sheet of material against said sheets while the latter are so held, and a driving mechanism adapted consecutively to drive said rotary members from their first to their second stopping position, to actuate said pressing means, and to turn said rotary members from said second to said first stopping position.

38. In apparatus for assembling shoe parts the combination of a pair of segmental, intermittently driven, presser rolls adapted in one of their stopping positions to receive certain of said parts with margins of the latter resting on their flattened sides, and in a second stopping position to hold said margins exposed in predetermined relation to each other, against said flattened sides, with adjacent portions of said shoe parts extending from said flattened sides through the nip of the rolls, means for pressing another sheet of material against said margins while they are so held, and a driving mechanism adapted consecutively to drive said rolls from their first stopping position to their second stopping position, to actuate and withdraw said pressing means, and to turn said rolls from their second to their first stopping position.

39. In apparatus for assembling adhesive sheets of material, the combination of a suction-faced member having a work-receiving position in which it is adapted to have a piece of stock presented to its suction face, and a pressing position different from said receiving position, means for creating a suction on said face, means for pressing a second piece of stock against a piece of stock held on said suction face when the latter is in said pressing position, and actuating mechanism adapted consecutively to move said suction faced member from work-receiving to pressing position, to actuate said pressing means, to move said suction-faced member from pressing to work-receiving position, and at stated times in relation to the aforesaid movements to apply and to break said suction.

40. In apparatus for assembling shoe parts, the combination of a pair of segmental intermittent presser rolls each having its rolling surface interrupted by a flattened suction face, said rolls having a work-receiving, stopping position in which their suction faces are accessible from one side of their nip and a pressing position in which said faces lie in predetermined relation to each other at the other side of their nip, means for applying suction to said suction faces, and actuating mechanism adapted consecutively to turn said rolls from work receiving to pressing position, to actuate said pressing means, to turn said rolls from pressing to work-receiving position, and at stated times in relation to the aforesaid movements to apply and to break said suction.

41. In apparatus for assembling adhesive sheets of material, the combination of a movable suction member adapted to hold a piece of stock by suction and having a work receiving and a pressing position, means for applying suction to said member, a presser device adapted to coact with said suction member in a pressing action upon the work, means actuated by the movement of said presser device for moving said suction member, a fluid pressure cylinder for actuating said presser device, and a distributor valve actuated by the movements of said presser device for controlling the action of said suction applying device and said presser device.

42. In apparatus for assembling adhesive sheets of material, a suction member for holding a piece of stock, pressing means adapted to coact with said suction member in a pressing action upon the work, fluid pressure means for actuating said pressing means, an ejector for applying suction to said suction member, a supply line for said ejector, a fluid-pressure-actuated valve for said supply line, a source of fluid pressure, and a valve structure adapted to connect said source with said fluid-pressure-actuated valve and with said fluid pressure means.

43. In apparatus for assembling adhesive sheets of material, the combination of a member against which the work may be pressed and a work-pressing device adapted to press the work against said member, said work-pressing device comprising a movable support, adapted to be presented to and retracted from said member, a roller mounted on said support and adapted to roll the work, a rack carried by said support, disposed transversely with relation to the movement of said support, and having driving connection with said roller, a pinion carried by said support and meshed with said rack, and a rack, not carried by said support, for driving said pinion.

44. In apparatus for assembling adhesive sheets of material, means for holding a piece of stock exposed, and a stock pressing device adapted to act against said holding means, said device comprising a flexible diaphragm adapted to support a piece of stock, a movable support for said diaphragm adapted to present the latter with the stock thereon to the stock on said holding means, a carriage mounted on said support between the latter and said diaphragm, and adapted for movement transverse to the movement of said support, a presser roll mounted on said carriage, a rack secured to said carriage and extending in a direction transverse to the movement of said support, a pinion journaled on said support and meshed with said rack, a rack mounted independently of said support, meshed with said pinion, and extending parallel with the direction of movement of said support, means for moving said support, and means for actuating the last mentioned rack.

45. In apparatus for assembling adhesive sheets of material, the combination of means for holding a sheet of stock exposed, and a stock-pressing device adapted to act against said holding means, said device comprising a movable support provided with a run-way on its side next to the work, a rotary member mounted to run on said run-way, and a presser roll peripherally driven by said rotary member.

46. In apparatus for assembling adhesive sheets of material, the combination of means for holding a sheet of stock in a horizontal position with its lower face exposed, a vertically movable support thereunder, a frame adapted to be mounted upon and withdrawn from said support, a flexible diaphragm mounted in said frame, and a traveling roll mounted upon said support and adapted to run upon the under side of said diaphragm.

47. In apparatus for assembling adhesive sheets of material, the combination of means for holding a sheet of stock in a horizontal position with its lower face exposed, a vertically movable support thereunder, a frame adapted to be mounted upon and withdrawn from said support, a flexible diaphragm mounted in said frame, yielding supporting means for said frame mounted upon said support, and a traveling roll mounted upon said support and adapted to run upon the under side of said diaphragm.

48. In apparatus for assembling adhesive sheets of material, the combination of means for holding a sheet of stock with its lower face exposed, a vertically movable support thereunder, a work-carrying member adapted to receive a piece of stock laid thereon and to be moved horizontally onto said support, means for raising said support to bring the second piece of stock in contact with the first piece of stock, and a latch for holding said means out of operating position, said latch being adapted to be tripped by the movement of said work-carrying member relative to said support.

49. In apparatus for assembling adhesive sheets of material, the combination of means for holding a sheet of stock with its lower face exposed, a vertically movable support thereunder, a spring supported rail mounted upon said support, a frame mounted upon said rail and adapted to run thereon, a diaphragm mounted in said frame, and adapted to carry a piece of stock laid thereon, and means on said support, under said diaphragm, for pressing it, with the stock thereon, against the first mentioned piece of stock.

50. In apparatus for assembling adhesive sheets of material, the combination of means for holding a piece of stock with its lower face exposed, a vertically movable support thereunder, a dowel mounted on said support, a stationary, horizontal rail adjacent said vertically movable support, a frame adapted to run on said rail and having an aperture to receive said dowel, a diaphragm mounted in said frame and adapted to support a piece of stock laid thereon, yielding means on said support adapted to support said frame and lift it from said rail as said support rises, and means on said support, under said diaphragm, for pressing the latter, with the stock thereon, against the first said piece of stock.

51. In apparatus for assembling adhesive sheets of material, the combination of a rotary member having a suction-face adapted to hold a piece of stock by suction and having a work-receiving and a pressing position, a support movable from and toward the pressing position of said suction-face, a diaphragm mounted on said support, a traveling presser roll on said support under said diaphragm, and actuating mechanism adapted, upon being started by the operator, automatically to actuate the aforesaid parts throughout the following operations: turn said member from work receiving to pressing position: move said support toward said position: actuate said traveling roller against said diaphragm: withdraw said support, return said rotary member to work receiving position; and at stated times make and break said suction.

52. In apparatus for assembling adhesive sheets of material, the combination of means for holding a piece of stock, a flexible diaphragm adapted to carry a piece of stock laid thereon into contact with the first said piece, means back of said diaphragm for pressing it toward said holding means, and a shield member mounted on the front face of said diaphragm and adapted to overlie and shield a part of the piece of stock laid thereon to keep said part out of contact with the first said piece.

53. Apparatus for assembling adhesive sheets of material, said apparatus comprising a plurality of supports adapted to hold respective sheets of said material against their faces by suction, means for moving said supports through a cycle of movements including stock receiving and stock pressing positions, their stock pressing positions being such as to present said sheets in the relative positions they are to occupy in the finished work, and means for applying another sheet to the aforesaid sheets while the latter are so presented.

In witness whereof I have hereunto set my hand this 29 day of March, 1922.

FRANK J. MacDONALD.